Sept. 6, 1966  G. BARGEL  3,270,859
APPARATUS FOR HANDLING BOTTLES AND SIMILAR CONTAINERS
Filed May 13, 1964  3 Sheets-Sheet 2

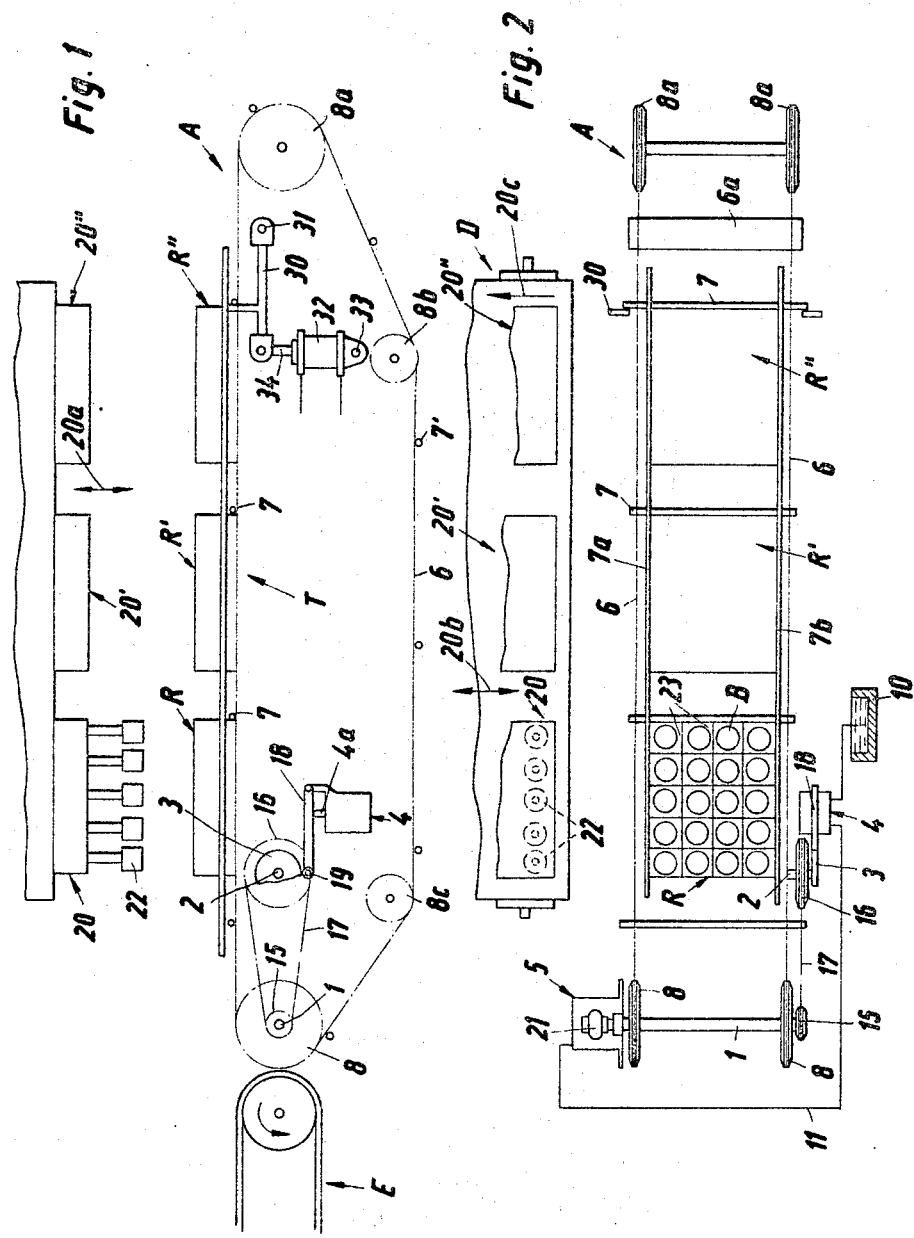

Inventor:
Günter Bargel
by Michael J. Striker
his attorney

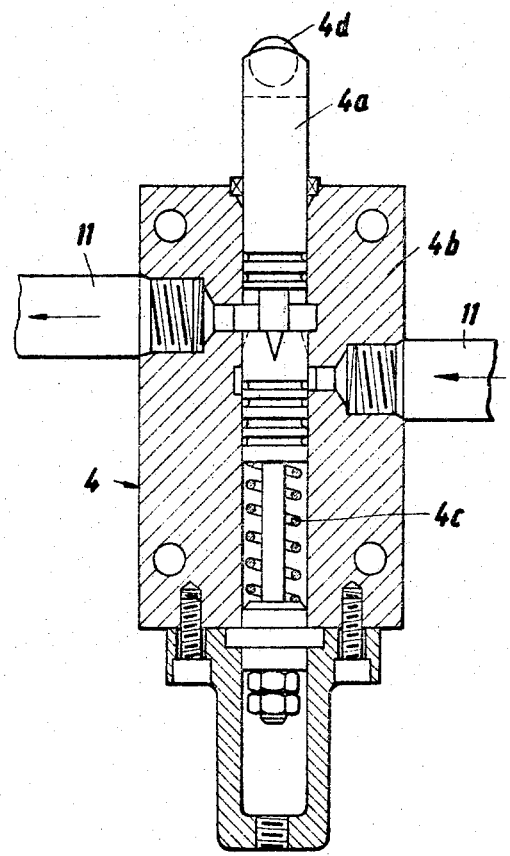

3,270,859
APPARATUS FOR HANDLING BOTTLES AND SIMILAR CONTAINERS
Günter Bargel, Dortmund-Korne, Germany, assignor to Holstein & Kappert, Dortmund, Germany
Filed May 13, 1964, Ser. No. 366,984
12 Claims. (Cl. 198—110)

The present invention relates to an apparatus for handling bottles, cans, jars and other types of containers, and more particularly to an apparatus for transferring properly arrayed containers into and from crates or similar receptacles. Still more particularly, the invention relates to an improved conveyor which is used in such apparatus for delivering empty or filled receptacles to a transfer station at which the receptacles are loaded with arrayed containers or are relieved of their contents.

It is an important object of my invention to provide an improved conveyor which is capable of advancing the receptacles at such a speed and in such a way that the mechanism which transfers arrayed containers into or from consecutive receptacles or groups of receptacles will have ample time to effect the transfer and that, at the same time, the receptacles will be advanced at maximum permissible speed to insure that the apparatus will handle as many containers as is possible without any damage thereto.

Another object of the invention is to provide a novel control arrangement which is used in the apparatus of the above outlined characteristics and which serves to regulate the speed of the conveyor in dependency on the distance between a given receptacle and the transfer station.

A further object of the invention is to provide a control arrangement which may be operated automatically by the same means which drives the conveyor so that the operation of the control arrangement is always accurately synchronized with the operation of the conveyor.

A concomitant object of the invention is to provide a conveyor which serves to deliver empty or loaded crates or similar receptacles to a transfer station and which is operated in such a way that consecutive receptacles remain in requisite position with reference to each other not only while they advance toward but also at the time they reach the transfer station.

Still another object of the invention is to provide a conveyor of the above outlined characteristics which is especially suited for delivering crates for milk bottles or beer bottles to a transfer station wherein empty bottles are removed from crates for the purpose of cleaning and subsequent filling or wherein filled, properly sealed and accurately arrayed bottles are transferred into empty crates.

With the above objects in view, one feature of my invention resides in the provision of an apparatus for transferring bottles and other types of containers into and out of crates or similar receptacles. The apparatus comprises a conveyor which is arranged to advance consecutive receptacles along an elongated path and toward a transfer station at which the receptacles receive a supply of arrayed containers or are relieved of their contents, a variable-speed motor which is operatively connected with and which is arranged to drive the conveyor at variable speed, and a control arrangement for regulating the motor in such a way that, whenever a receptacle approaches the transfer station, the speed of the conveyor decreases to insure that, owing to inertia, the receptacle does not change its position with reference to the conveyor when the conveyor is brought to a full stop in order to facilitate loading or unloading of receptacles. Such gradual reduction in the speed of the conveyor is necessary because, as a rule, the receptacles are positively entrained by suitable motion transmitting members so that they must travel at a speed which is not less than that speed of the conveyor, but each receptacle is normally free to move forwardly with reference to the conveyor.

In accordance with another feature of my invention, the construction of the apparatus is preferably selected in such a way that, after the speed of the conveyor is gradually reduced and when a receptacle reaches the transfer station, the conveyor comes to a full stop so that the containers may be loaded into or removed from a stationary receptacle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a somewhat schematic side elevational view of a conveyor which delivers consecutively groups of three receptacles to a transfer station and whose speed is regulated by the control arrangement of the present invention;

FIG. 2 is a top plan view of the conveyor;

FIG. 4 is an enlarged axial section through an adjustable throttle valve which constitutes one element of the control arrangement for the hydraulic drive means of FIG. 3.

Figure 3:
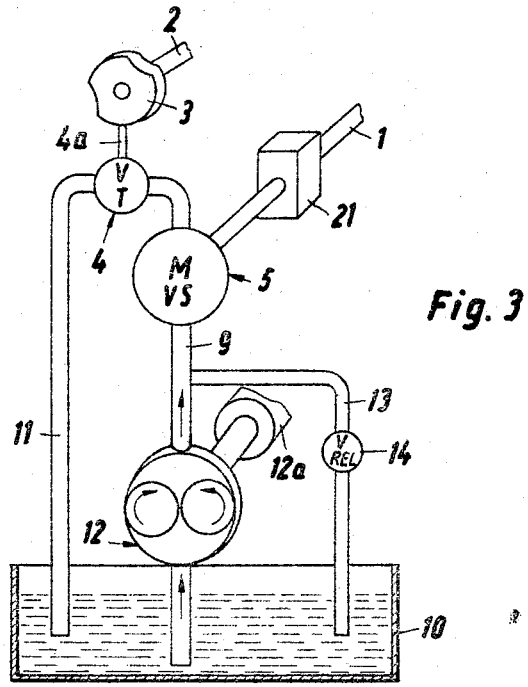
FIG. 3 is a diagrammatic view of the hydraulic drive means for the conveyor.

Referring to the drawings, and first to FIGS. 1 and 2, there is shown a portion of an apparatus for handling bottles, jars, cans or similar containers B and which includes an endless conveyor A serving to deliver crates or similar receptacles R, R', R" to a transfer station T at which the receptacles receive properly arrayed containers or are relieved of their contents. It is assumed, for the sake of simplicity, that the conveyor A of FIG. 1 is utilized for delivering filled receptacles to the transfer station T at which all containers accommodated in the receptacles R, R', R" are removed in a simultaneous operation to be transferred onto a suitable conveyor D which is adjacent to one side of the conveyor A. Empty receptacles may be delivered to a conveyor E which is adjacent to the left-hand end turn of the conveyor A.

The conveyor A comprises two spaced endless sprocket chains 6 which are trained around a pair of driver sprockets 8 and around pairs of idler sprockets 8a, 8b, 8c. The chains 6 are connected by transversely extending carriers 6a (one shown in FIG. 2) which support the receptacles while advancing along an elongated path defined by the horizontal upper run of the conveyor A extending between the sprockets 8, 8a. The chains 6 are further connected by transversely extending equidistant motion transmitting bars 7 which abut against the trailing edges of consecutive receptacles and which insure that the receptacles remain equidistant from each other and also that the receptacles must travel at a speed which at least equals the speed of the conveyor A.

The arresting means for intermittently halting the conveyor A for predetermined intervals of time comprises a pair of stops 30 each turnable with a horizontal shaft 31 which is mounted in the frame of the apparatus and each rockable by a hydraulic or pneumatic double-acting cylinder 32 which is mounted on a horizontal pivot pin 33. The piston rod 34 of the cylinder 32 is coupled to one of the stops 30 and is reciprocated at such intervals that the stops engage each third bar 7 of the conveyor A and remain in engagement therewith for an interval of time which is necessary to withdraw bottles B from all three receptacles R'–R''.

The sprockets 8 constitute two elements of a drive means for the conveyor A and are mounted on a horizontal shaft 1 which is driven by a variable-speed hydraulic motor 5 through a suitable transmission 21. For example, the ratio of this transmission may be 30:1 or thereabout. The hydraulic circuitry of the drive means is shown in FIG. 3. Thus, the intake of the motor 5 is connected with a supply conduit 9 leading to a source of hydraulic fluid here shown as an oil tank 10. The outlet of the motor 5 is connected with a return conduit 11 leading to the tank 10, and the supply conduit 9 contains a gear pump 12 which is driven by an electric motor 12a and delivers pressure fluid to the motor 5. An overflow line 13 communicates with the supply conduit 9 at a point downstream of the pump 12 and contains a pressure relief valve 14 which permits return flow of compressed fluid in response to a predetermined pressure.

The control arrangement for the motor 5 comprises an adjustable throttle valve 4 which is mounted in the return conduit 11 and which regulates the rate at which fluid may flow from the outlet of the motor back to the tank 10. This valve 4 is adjusted in a fully automatic way by the peripheral cam face of a specially configurated rotary plate cam 3 which is mounted on a horizontal shaft 2 and which is driven by the shaft 1 but which may also be driven directly by the transmission 21. The driving connection between the shafts 1 and 2 comprises a sprocket wheel 15 on the shaft 1, a sprocket wheel 16 on the shaft 2, and an endless chain 17 which is trained around the wheels 15, 16. In the illustrated embodiment, the housing of the throttle valve 4 carries a pivotable lever 18 (shown in FIGS. 1 and 2) which is provided with a roller follower 19 arranged to track the face of the cam 3. The follower 19 is maintained in contact with the cam 3 by a spring-biased stem 4a best shown in FIG. 4. The frame in which the shafts 1, 2 and the shafts of sprocket wheels 8a–8c are mounted is not shown in the drawings.

The transfer station T accommodates a group of three horizontally and vertically reciprocable carriages 20, 20', 20'' of the type similar to that disclosed in a copending application Serial No. 268,239, filed by me jointly with Robert Eggert and assigned to the same assignee. The exact construction of the carriages 20–20'' forms no part of this invention, and it suffices to say that each carriage may move up and down (arrow 20a) as well as back and forth (arrow 20b) so that it may withdraw arrayed containers B from one of the receptacles R, R', R'' and that it may transfer such containers onto the conveyor D which advances the containers into a washing, sterilizing, drying, filling, sealing and crating machine, see the arrow 20c. Empty receptacles advance onto the conveyor E and may be delivered to the crating machine. Each carriage supports a series of downwardly extending pneumatically operated gripper heads 22 of conventional design, one for each container B in a receptacle. FIG. 2 shows that the foremost receptacle R is provided with intersecting partitions 23 which define twenty compartments for an equal number of accurately arrayed containers B. The number of gripping heads 22 on each of the carriages 20–20'' is the same. If the containers B are bail stopper bottles, the heads 22 may be constructed in a manner as disclosed in my copending application Serial No. 268,241, now Patent No. 3,178,217 to which reference may be had if necessary.

The apparatus of my invention operates as follows:

Fully loaded receptacles R, R', R'' are delivered consecutively onto the right-hand end of the upper run of conveyor A so that each receptacle abuts against one of the motion transmitting bars 7 and is centered between two fixed side rails 7a, 7b. The pump 12 is in operation and causes the motor 5 to drive the shafts 1, 2 at the speed determined by the throttle valve 4 whose momentary setting in turn depends on the angular position of the cam 3. The configuration of the face on the cam 3 is selected in such a way that the conveyor A first travels at a constant speed, that its speed decreases gradually as the receptacles R–R'' approach the transfer station T, and that its speed is almost zero when the receptacles of a group almost reach the transfer station. The receptacles come to a full halt when the stops 30 engage the bar 7 which abuts the receptacle R'' and, during the ensuing interval of idleness of the conveyor A, the gripper heads 22 of the carriages 20–20'' are caused to descend and to rapidly withdraw all of the containers B from the receptacles R–R''. The cam 3 permits the motor 5 to accelerate the conveyor A as soon as the stops 30 are withdrawn so that the next group of three receptacles advances toward the transfer station T and that the empty receptacles R–R'' are delivered to the conveyor E. In the meantime, the carriages 20–20'' move to the positions shown in FIG. 2 to deposit sixty containers on the conveyor D but the carriages return to the positions of FIG. 1 in good time to withdraw sixty containers from the next group of three receptacles after the cam 3 again reduces the speed of the conveyor A and when the conveyor A comes to a full halt in response to engagement between the stops 30 and the bar 7' shown in FIG. 1. The same procedure is repeated when each consecutive group of three receptacles approaches and enters the transfer station T.

When the throttle valve 4 reduces the rate of fluid flow through the return conduit 11, the valve 14 opens and allows fluid delivered by the constantly driven pump 12 to return to the tank 10 via line 13. The motor 5 is always ready to drive the conveyor A, and this conveyor is at a standstill only when the stops 30 engage a selected motion transmitting bar.

The rate at which the cam 3 permits the throttle valve 4 to accelerate or decelerate the motor 5 is selected in such a way that the velocity curve of the conveyor A resembles, in shape, a sine wave. This insures that the receptacles R, R', and R'' remain in abutment with the respective motion transmitting bars 7 (i.e., that the receptacles are not propelled forwardly by inertia when the conveyor A is decelerated) which is very important because containers accommodated in a misaligned receptacle could not be engaged by the gripper heads 22 when a misaligned receptacle would enter the transfer station. During withdrawal of containers B from the receptacles, the conveyor A comes to a full halt.

Since the structure shown in FIGS. 1 to 3 constitutes but a small part of a complete bottle handling apparatus, and since the conveyor A must be operated in synchronism with the carriages 20–20'', with the conveyor D and with certain other elements of the apparatus, the driving connection between the shafts 1 and 2 is preferably constructed in such a way that each of these shafts must perform a full revolution while a new group of three receptacles advances to the transfer station T and into alignment with the carriages 20–20''.

FIG. 4 illustrates one form of an adjustable throttle valve 4 which may be used in the control arrangement of my invention. This valve comprises the aforementioned stem 4a which is reciprocable in a valve housing 4b and which is biased by a spring 4c. The mounting of the stem 4a is such that it normally tends to reduce the flow of fluid through the return conduit 11. The roller 4d at the free end of the stem 4a engages the lever 18, see FIG. 1. The exact construction of the valve shown in FIG. 4 forms no part of my invention.

Figure 5:
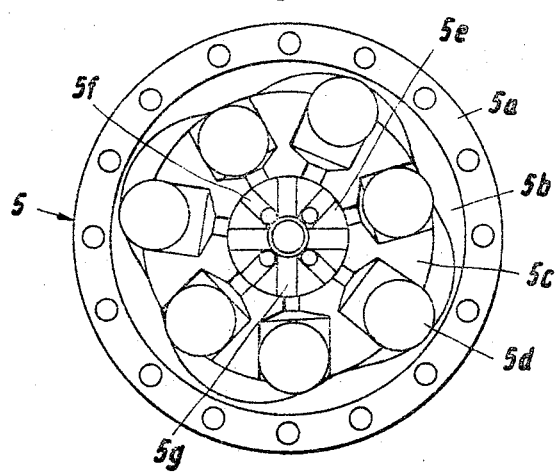
FIG. 5 is a transverse section through a variable-speed hydraulic motor which constitutes one element of the hydraulic drive means shown in FIG. 3.

FIG. 5 illustrates a variable-speed hydraulic motor 5 which may be used in the drive means for the conveyor A and which is of the type adapted to vary its speed in a fully automatic way and with utmost accuracy in response to adjustments of the throttle valve 4. This motor is also of known design and its construction has been shown for the sole purpose of illustrating a complete drive means for the conveyor A. It includes a stationary housing 5a provided with internal cams 5b and accommodating a rotor 5c which carries radially reciprocable fluid-displacing spherical pistons 5d. The housing 5a is rigid with a valve member 5e which is provided with fluid-admitting and evacuating bores 5f, 5g. When the pump 12 delivers pressure fluid to the bores 5f, the bores 5g communicate with the return conduit 11 whereby some of the pistons 5d are under pressure while the remaining pistons 5d expel fluid through the bores 5g. This well-known rotary piston pump 5 has been found to be especially suited for use in the drive means for the conveyor A when the latter is driven by hydraulically operated means. It goes without saying that the hydraulically operated drive means may be replaced by a mechanical or electrical drive as long as the drive enables the conveyor A to move in the above described manner so that the receptacles remain in requisite positions with respect to each other and with respect to the carriages. It is also clear that the apparatus of my invention may be constructed to allow for evacuation of bottles from one receptacle at a time, from two receptacles at a time, or from four or more receptacles at a time. This depends on the number of carriages and on the desired output of the apparatus.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for transferring bottles and other types of containers into and out of crates and similar receptacles, in combination, a conveyor arranged to advance receptacles consecutively along an elongated path and toward a transfer station at which the receptacles receive a supply of containers or are relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction; control means for regulating the speed of said conveyor in such a way that whenever a receptacle approaches the transfer station, the speed of the conveyor decreases; and arresting means located adjacent said path and intermittently movable into the path of said abutment means for preventing the movement of said conveyor in said predetermined direction against the action of said drive means when a receptacle reaches the transfer station.

2. In an apparatus for transferring bottles and other types of containers into and out of crates and similar receptacles, in combination, an endless conveyor having an upper run arranged to advance receptacles consecutively along an elongated path and toward a transfer station at which the receptacles receive a supply of containers or are relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction, said drive means for said conveyor including a rotary shaft, a variable-speed hydraulic motor, a driving connection between said motor and said shaft, a source of hydraulic fluid, supply conduit means connecting said source with said motor, return conduit means connecting said motor with said source, a pump mounted in said supply conduit means and arranged to deliver compressed fluid to said motor so that the latter drives said shaft to advance the receptacles along said path; control means for regulating the speed of said motor in such a way that, whenever a receptacle approaches the transfer station, the speed of said conveyor decreases, said control means comprising an adjustable throttle valve provided in one of said conduit means and cam means driven by said motor and arranged to adjust said throttle valve in response to rotation of said motor so as to vary the rate at which the fluid may flow through said one conduit means; and arresting means arranged to arrest said conveyor when at least one receptacle reaches said transfer station so that the receptacles may be loaded or unloaded while the conveyor is at a standstill, said arresting means being located adjacent said path and intermittently movable into the path of said abutment means for preventing the movement of said conveyor in said predetermined direction against the action of said drive means.

3. In an apparatus for transferring bottles and other types of containers into and out of crates and similar receptacles, in combination, an endless conveyor having an upper run arranged to advance receptacles consecutively along an elongated path and toward a transfer station at which the receptacles receive a supply of containers or are relieved of their contents, said conveyor including motion transmitting means arranged to engage a receptacle while moving along said path and abutment means fixed to said conveyor for movement therewith along said path; and arresting means located adjacent said path and intermittently movable into the path of said abutment means for preventing the movement of said conveyor in said predetermined direction against the action of said drive means when a receptacle reaches the transfer station, said drive means for said conveyor including a rotary shaft, a variable-speed hydraulic motor, a driving connection between said motor and said shaft, a source of hydraulic fluid, supply conduit means connecting said source with said motor, return conduit means connecting said motor with said source, a pump mounted in said supply conduit means and arranged to deliver compressed fluid to said motor so that the latter drives said shaft to advance the receptacles along said path; control means for regulating the speed of said motor in such a way that, whenever a receptacle approaches the transfer station, the speed of said conveyor decreases, said control means comprising an adjustable throttle valve provided in one of said conduit means and cam means driven by said motor and arranged to adjust said throttle valve in response to rotation of said motor so as to vary the rate at which the fluid may flow through said one conduit means, the configuration of said cam means being such that the conveyor is brought to a nearly full halt when a receptacle almost reaches the transfer station; and arresting means arranged to arrest the conveyor for a predetermined interval of time when a receptacle reaches said transfer station so that the receptacles may be loaded or unloaded while the conveyor is at a standstill, said arresting means being located adjacent said path and intermittently movable into the path of said abutment means for preventing the movement of said conveyor in said predetermined direction against the action of said drive means.

4. A combination as set forth in claim 3, wherein the velocity curve of the conveyor resembles the shape of a sine wave.

5. In an apparatus for transferring bottles and other types of containers into and out of crates and similar receptacles, in combination, an endless conveyor having an upper run arranged to advance consecutive receptacles along an elongated path and toward a transfer station at which the receptacles receive a supply of containers or are relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction, said drive means for said conveyor including a rotary shaft, a variable-speed hydraulic motor, a driving connection between said motor and said shaft, a source of hydraulic fluid, supply conduit means connecting said source with said motor, return conduit means connecting said motor with said source, a pump mounted in said supply conduit means and arranged to deliver compressed fluid to said motor so that the latter drives said shaft to advance the receptacles along said path; control means for regulating the speed of said motor in such a way that, whenever a receptacle approaches the transfer station, the speed of said conveyor decreases, said control means comprising an adjustable throttle valve provided in said return conduit means, a rotary cam arranged to adjust said throttle valve in response to rotation of said motor so as to vary the rate at which the fluid may flow through said return conduit means, and a driving connection between said motor and said cam; and arresting means for arresting said conveyor when a receptacle reaches said transfer station so that the receptacles may be loaded or unloaded while the conveyor is at a standstill, said arresting means being located adjacent said path and intermittently movable into the path of said abutment means for preventing the movement of said conveyor in said predetermined direction against the action of said drive means.

6. In an apparatus for transferring bottles and other types of containers into and out of crates and similar receptacles, in combination, an endless conveyor having an upper run arranged to advance receptacles, consecutively along an elongated path and toward a transfer station at which the receptacles receive a supply of containers or are relieved of their contents, said conveyor further comprising a plurality of transversely extending equidistant motion transmitting members each of which is arranged to engage a receptacle while moving along said elongated path and each of which includes abutment means; drive means for continuously transmitting driving torque to said conveyor tending to continuously drive said conveyor in a predetermined direction, said drive means for said conveyor including a rotary shaft, a variable-speed hydraulic motor, a driving connection between said motor and said shaft, a source of hydraulic fluid, supply conduit means connecting said source with said motor, return conduit means connecting said motor with said source, a pump mounted in said supply conduit means and arranged to deliver compressed fluid to said motor so that the latter drives said shaft to advance the receptacles along said path; control means for regulating the speed of said motor in such a way that, whenever a receptacle approaches the transfer station, the speed of said conveyor decreases gradually to insure that the receptacles remain in contact with the respective motion transmitting members, said control means comprising an adjustable throttle valve provided in one of said conduit means and cam means driven by said motor and arranged to adjust said throttle valve in response to rotation of said motor so as to vary the rate at which the fluid may flow through said one conduit means; and arresting means arranged to arrest the conveyor when a receptacle reaches said transfer station and to hold the conveyor against movement for a predetermined period of time so that the receptacles may be loaded or unloaded while the conveyor is at a standstill, said arresting means being located adjacent said path and intermittently movable into the path of said abutment means for preventing the movement of said conveyor in said predetermined direction against the action of said drive means.

7. In an apparatus for withdrawing arrayed bottles and other types of containers from crates and similar receptacles each of which accommodates the same number of containers, in combination, a conveyor arranged to advance receptacles consecutively along an elongated path and toward a transfer station at which the receptacles are relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction, said drive means including a variable-speed motor operatively connected with and arranged to drive said conveyor; control means for regulating the speed of said motor in such a way that, whenever a receptacle approaches the transfer station, the speed of the conveyor decreases gradually; and arresting means arranged to arrest the conveyor for a predetermined interval of time whenever a receptacle reaches said transfer station so that the receptacles may be relieved of their contents while the conveyor is at a standstill, said arresting means being located adjacent said path and intermittently movable into the path of said abutment means for preventing the movement of said conveyor in said predetermined direction against the action of said drive means.

8. In an apparatus for transferring bottles and other types of containers into and out of crates and similar receptacles, in combination an endless conveyor having an upper run arranged to advance groups of receptacles consecutively along an elongated path and toward a transfer station at which the groups of receptacles simultaneously receive a supply of containers or are simultaneously relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction, said drive means for said conveyor including a rotary shaft, a variable-speed hydraulic motor, a driving connection between said motor and said shaft, a source of hydraulic fluid, supply conduit means connecting said source with said motor, return conduit means connecting said motor with said source, a pump mounted in said supply conduit means and arranged to deliver compressed fluid to said motor so that the latter drives said shaft to advance the groups of receptacles along said path; control means for regulating the speed of said motor in such a way that, whenever a group of receptacles approaches the transfer station, the speed of said conveyor decreases, said control means comprising an adjustable throttle valve provided in one of said conduit means and cam means driven by said motor and arranged to adjust said throttle valve in response to rotation of said motor so as to vary the rate at which the fluid may flow through said one conduit means, the distance between consecutive groups of receptacles on the upper run of said conveyor being selected in such a way that said shaft must complete a full revolution to move a new group of receptacles to the transfer station; and arresting means arranged to arrest said conveyor for a predetermined interval of time whenever a group of receptacles reaches said transfer station so that the receptacles of a group may be loaded or unloaded while the conveyor is at a standstill, said arresting means being located adjacent said path and intermittently movable into the path of said abutment means for preventing the movement of said conveyor in said predetermined direction against the action of said drive means.

9. In an apparatus for transferring bottles and other types of containers into and out of crates and similar receptacles, in combination, a conveyor arranged to advance receptacles consecutively along an elongated path and toward a transfer station at which the receptacles receive a supply of containers or are relieved of their contents, said conveyor including motion transmitting means arranged to engage a receptacle while moving along said path and abutment means fixed to said conveyor for movement therewith along said path; drive means for continuously transmitting driving torque to said conveyor tending to continuously drive said conveyor in a predetermined direction; and arresting means located adjacent said path and intermittently movable into the path of said abutment means for preventing the movement of said conveyor in said predetermined direction against the action of said drive means when a receptacle reaches the transfer station.

10. In an apparatus according to claim 9, wherein said drive means comprises hydraulic motor means, said apparatus further comprising means for regulating the speed of said conveyor in such a way that whenever a receptacle approaches the transfer station, the speed of the conveyor decreases.

11. In an apparatus according to claim 10, wherein said motion transmitting means includes a plurality of transversely extending motion transmitting members carried by said conveyor and each of which is arranged to engage a receptacle while moving along said path so as to accurately position the receptacle with respect to said path when said conveyor is prevented from moving by said arresting means.

12. In an apparatus according to claim 10, wherein said abutment means includes a plurality of longitudinally spaced abutment members fixed to and projecting from said conveyor, said arresting means including a stop member movable into the path of said projecting abutment members to engage one of said abutment members for preventing movement thereof and thereby of said conveyor in said predetermined direction.

References Cited by the Examiner
UNITED STATES PATENTS

| | | | |
|---|---|---|---|
| 2,402,742 | 6/1946 | Ellis | 198—135 X |
| 2,862,634 | 12/1958 | Chalich | 214—309 |
| 3,021,851 | 2/1962 | Morin | 198—110 X |

EVON C. BLUNK, *Primary Examiner.*

EDWARD A. SROKA, *Examiner.*